April 29, 1952     W. A. ROCCO     2,594,998
SINGLE CRYSTAL FABRICATION
Filed Feb. 23, 1950
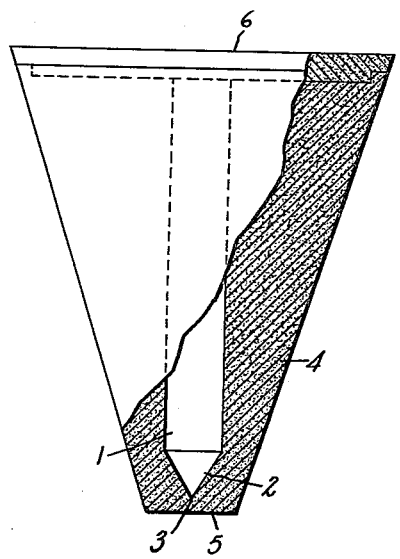
Inventor:
William A. Rocco,
by    *Andrew Cross*
His Attorney.

Patented Apr. 29, 1952

2,594,998

UNITED STATES PATENT OFFICE 2,594,998

SINGLE CRYSTAL FABRICATION

William A. Rocco, Scotia, N. Y., assignor to General Electric Company, a corporation of New York Application February 23, 1950, Serial No. 147,390

1 Claim. (Cl. 22—212)

The present invention relates to a method of and mold for the fabrication of large single crystals of metals.

Various methods have been proposed and used for the fabrication of single crystals. The method most generally employed prior to the present invention consists of lowering a molten mass of metal from a high temperature zone into a cooling zone at a controlled rate. This method is ordinarily carried out in a Bridgman type furnace as described, for example, in Bridgman Patent 1,793,672. Single crystals have also been produced electrolytically and in the case of tungsten by heating pressed powdered tungsten under particular atmospheric conditions.

Most of these prior methods have required the use of special and in some cases elaborate apparatus, while all or practically all of them have been time consuming and have required the constant and careful attention of a skilled operator.

In accordance with the present invention, there has been provided a simple and effective method of fabricating single crystals by means of a new and improved mold which in itself constitutes one of the features of the invention. Additional features and advantages of the invention will become apparent from the following description taken in connection with the accompanying drawing in which the single figure is an elevational view, partly in section, of the improved mold.

In carrying out the invention, it is essential that the mold be so constructed that the heat of the molten metal contained therein will be extracted most readily from the bottom thereof and progressively less readily upwardly along the sides of the mold. For this purpose, the mold of the present invention is characterized by a relatively thin bottom portion and walls which are substantially thicker than that bottom portion with the thickness thereof gradually increasing from the bottom to the top of the mold.

The mold of the present invention preferably comprises a solid body of graphite or other suitable material of relatively good heat insulating properties, i. e., having a relatively low heat transfer as compared, for example, to molds of metal. In the modification shown in the drawing, the mold comprises a solid body of graphite including a mold cavity or chamber 1 extending vertically along the vertical axis of the mold and having a concave bottom portion 2 terminating at a tip 3. The mold cavity is preferably of cylindrical cross section. The exterior of the mold is generally of a conical shape with the exterior walls 4 extending divergently upward from a flat bottom exterior portion 5 on which the mold rests.

By this arrangement, the walls of the mold gradually increase in thickness towards the top of the mold with the thinnest portion of the mold being that adjacent the tip 3 of the mold cavity. To protect the molten metal in the cavity during the heating operation, there is provided a suitable lid 6 of graphite or other suitable heat insulating material closing the top of cavity 1.

It has been found that by employing a mold of the type just described, single crystals of metal can be produced merely by filing the mold cavity 1 with a suitable quantity of metal, heating the mold and the charge above the melting point of the charge and thereafter subjecting the heated mold and metal to an ambient temperature somewhat below the melting point of the metal, for example, from 50–150° C. below the melting point of the metal for a period of time sufficient to allow for the complete solidification of the charge.

When the mold and metal charge previously heated above the melting point of the metal is subjected to such lower temperatures, the heat is gradually dissipated from the exterior surfaces of the mold and, therefore, also from the charge, the rate of heat extraction from any particular part of the charge being proportional to or dependent upon the wall mold thickness of the mold adjacent that part of the charge. Since the thinnest section of the mold is that adjacent the tip 3 of the mold cavity, the metal at this part of the mold is the first to cool to a solidification temperature and due to the shape of this portion of the cavity, solidification generally starts as a single crystal nucleus. As cooling of the charge proceeds by the continuous extraction of heat from the charge both through the wall portion of the mold adjacent tip 3 and progressing upwardly along the sides of the mold, the solidification of the molten metal proceeds upwardly through the cavity and the singel nucleus solid metal originally formed at the point 3 continues to grow as a single crystal until all of the charge has solidified.

Since the formation of the single crystal is dependent upon the gradual and controlled solidification of the metal within the mold cavity 1, it is essential in the practice of the present invention that the thinnest wall portion of the mold be that adjacent the tip 3 of the cavity 1 and the thickest adjacent the top of the mold cavity. While the relative dimensions of the wall and the mold cavity are not as critical as might be expected, for best results, it has been found that the side walls of the mold at all points above the tip 3 should be of a greater thickness than that of the mold wall below the tip and should gradually increase in thickness towards the top of the mold with the wall thickness at the top of the mold being equal to at least twice the diameter and at least one-third the depth of the mold chamber with the minimum thickness of the bottom portion of the mold adjacent the tip 3 being less than one-half the diameter of the chamber. By maintaining these approximate proportions, the initial solidification of the molten charge at the tip 3 of the mold is assured, and the formation of any other crystal nuclei at a point elsewhere in the mold cavity prior to the growth of the crystal to that point is substantially prevented.

In carrying out the process of the present invention, the mold and metal charge can conveniently be heated to an elevated temperature above the melting point of the charge in any of the usual metallurgical furnaces. When both the mold and the charge have attained the desired temperature, the mold is transferred either to a cooler region within the furnace or to a second enclosure wherein the temperature is somewhat below the melting point of the metal. As soon as sufficient heat has been extracted to the bottom 5 of the mold, solidification will begin at the tip 3 and progress upwardly along the mold cavity as additional heat is extracted through the bottom of the mold and through the side walls of the mold.

Single crystals of practically any desired metal can be obtained by this method. Consistently good results have been obtained in the fabrication of cooper and aluminum crystals. By way of example, single crystals of both copper and aluminum have been fabricated employing a mold which was three and one-half inches high including the cover portion 7, with a three inch diameter top and a three-quarter inch diameter base 5. The mold cavity was formed by drilling a seven-sixteenths hole into the center of the mold body with the drill ground to a 60° point. The tip 3 of this hole extended to within one-eighth inch of the bottom 5 of the mold. An OFHC copper rod was placed in the mold, and the mold and its charge placed in a hydrogen atmosphere furnace operating at 1200° C. The mold was kept at this temperature for 20 minutes so that the copper was completely melted. The mold was then moved towards one end of the furnace into the zone where the ambient temperature was about 900° C. After 15 minutes at this temperature, the copper had solidified and the mold was removed from the furnace. The solid copper specimen was etched and found to be of a single crystal structure. Similar results had been obtained using the same mold in the manufacture of aluminum and other metal crystals.

What I claim as new and desire to secure by Letters Patent of the United States is:

The method of fabricating a metal single crystal which consists essentially of the steps of (1) placing a charge of metal in a graphite mold having annular inner walls defining a vertically-extending, substantially cylindrical mold cavity having a tapered bottom portion terminating at a point, the side walls of said mold being of a thickness greater than the minimum thickness of the mold adjacent the bottom portion of said mold cavity and gradually increasing in thickness towards the top of said mold, the wall thickness at the top of the mold being equal to at least about twice the diameter and at least one-third the depth of said mold cavity and the thickness of the mold adjacent the bottom portion of said mold cavity being less than one-half the diameter of said chamber, (2) heating both the graphite mold and the charge of metal to a temperature above the melting point of the metal, and (3) immediately thereafter subjecting both the entire mold and its metal contents to an ambient temperature from 50 to 150° C. below the melting point of the metal for a period of time sufficient to effect the solidification of the metal in the form of a single crystal.

WILLIAM A. ROCCO.

REFERENCES CITED

The following references are of record in the file of this patent:

UNITED STATES PATENTS

| Number | Name | Date |
|---|---|---|
| 1,793,672 | Bridgman | Feb. 24, 1931 |
| 1,920,638 | Driggs | Aug. 1, 1933 |
| 2,214,976 | Stockbarger | Sept. 17, 1940 |
| 2,368,719 | Miller | Feb. 6, 1945 |
| 2,420,003 | Miller | May 6, 1947 |

FOREIGN PATENTS

| Number | Country | Date |
|---|---|---|
| 22,181 | Great Britain | of 1895 |